United States Patent [19]

Steele

[11] Patent Number: 4,708,535

[45] Date of Patent: Nov. 24, 1987

[54] SEAL IN HIGH PRESSURE PNEUMATIC BOOSTER VALVE

[75] Inventor: James R. Steele, Stillwater, Minn.

[73] Assignee: Dynamic Air Inc., St. Paul, Minn.

[21] Appl. No.: 9,076

[22] Filed: Jan. 27, 1987

Related U.S. Application Data

[63] Continuation of Ser. No. 896,291, Aug. 11, 1986, abandoned, which is a continuation of Ser. No. 630,327, Jul. 12, 1987, abandoned.

[51] Int. Cl.⁴ ............................................. B65G 53/58
[52] U.S. Cl. ....................................... 406/93; 137/853
[58] Field of Search ...................................... 406/93–95, 406/14; 137/853, 614.2, 312; 251/146

[56] References Cited

U.S. PATENT DOCUMENTS

| | | | |
|---|---|---|---|
| 2,621,889 | 12/1952 | Annin | 137/853 |
| 2,941,541 | 6/1960 | Peras | 137/853 X |
| 3,065,761 | 11/1962 | Peras | 137/853 X |
| 3,448,766 | 6/1969 | Schule | 137/853 X |
| 3,499,461 | 3/1970 | Tuma | 137/853 X |
| 3,708,207 | 1/1973 | Steele | 406/93 |
| 4,039,139 | 8/1977 | Bird | 137/853 X |
| 4,313,699 | 2/1982 | Steele | 406/93 |

FOREIGN PATENT DOCUMENTS 2093954  9/1982  United Kingdom ................ 137/853

Primary Examiner—Jeffrey V. Nase
Attorney, Agent, or Firm—Jacobson and Johnson

[57] ABSTRACT

A housing containing a chamber having an inlet bore and an outlet bore with an elongated resilient annular seal having one end fixedly attached around the inlet bore and its other end facing the outlet bore resiliently sealed around the surface of a solid plug located in the chamber.

5 Claims, 2 Drawing Figures

SEAL IN HIGH PRESSURE PNEUMATIC BOOSTER VALVE

This application is a continuation of application Ser. No. 896,291 filed Aug. 11, 1986, now abandoned, which was a continuation of application Ser. No. 630,327 filed July 12, 1984, now abandoned.

FIELD OF THE INVENTION

This invention is directed for use with pneumatic conveying equipment which is generally used to carry dry granular material such as sand, salt, flour, cement and the like from one location to another. In particular, this invention is for attachment to the conduit through which the material flows to boost or increase the air flow or air pressure in the conduit along the line of travel of the material.

U.S. Pat. No. 3,708,207 dated Jan. 2, 1973 titled "High Pressure Booster Valve" which is assigned to the same assignee as the instant application briefly explains the operation of pneumatic conveyor systems and describes briefly the two basic types. One type, which is sometimes called "dilute phase", uses generally large amounts of air to carry relatively small amounts of material at high speeds. In the other, which is sometimes referred to as "dense phase", the conduit or conveyor tube is practially filled with the material and the material is moved along slowly by relatively small amounts of air with air pressure applied at the source and at various locations along the conveyor tube to compensate for frictional losses.

Similar to the above-identified '207 patent the present invention pertains to the booster valves which are located along the conveyor conduit to serve the function of adding pneumatic pressure or gas flow as required in order to keep the material moving steadily through the conveyor tube.

DESCRIPTION OF THE PRIOR ART

The booster valve described in the above-idnetified patent is attached around the conveying tube and feeds the booster gas, usually air, into the conveying line generally parallel to the air and material flow. A different development of a booster valve appears in U.S. Pat. No. 4,313,699 dated Feb. 2, 1982 titled "Quick Mount High Pressure Booster Valves" also assigned to the same assignee as the instant application. This type of booster valve while serving the same general purpose is attached radially to the conveying tube so that the supporting or boosting air enters the conveyor at about right angles to the flow. There are certain benefits and detriments to each type of booster valve. The present invention is directed toward a booster valve of the latter type which is attached to the conveyor tube radially so that the air enters at about a right angle to the material flow.

A major problem with all air booster valves is the function of being able to provide booster air as needed while being able to seal off the air input so that there is no back flow of the material from the conveyor tube when no booster air is injected. U.S. Pat. No. 4,313,699 uses a valve seal 23 which is cylindrical and hollow but closed off at one end and made of a flexible resilient material such as rubber. The seal flexes radially inward in response to a pressure differential allowing air to flow from the source to the conveyor tube through slots 46. When the air pressure from the source is reduced the seal returns to its unflexed condition and closes off the slots to prevent back flow. While this operates quite satisfactorily, from time to time a problem can occur with the degree of sealing and the possibility of material finding its way under the seal resulting in some back flow.

SUMMARY OF THE INVENTION

In the instant invention a housing contains a hollow chamber, an inlet opening or bore for communication or connection to the source of pressurized booster air and an outlet bore from the chamber for connection to the conveyor tube. A rigid plug member is located in the chamber and is covered with an annular or sleeve-like rubber seal which tightly closes around the plug. One end of the sleeve-like seal is firmly secured to the housing wall around the inlet bore and the other end faces the outlet bore. In this fashion normally the communication from the inlet bore to the outlet bore through the chamber is closed off but when it comes time to apply booster air the pressurized air at the inlet bore forces the seal away from the plug so that the air can get around the plug and enter the chamber and leave through the outlet bore. When the inlet air pressure is removed the seal resiliently returns to its tight fit around the plug member.

As a feature the plug has a circumferential surface that the seal closes on and an adjoining surface which tapers inwardly toward the outlet bore with the outlet edge of the seal located a small distance back from where the two surfaces adjoin. In this fashion when there is any reverse or back pressure at the outlet bore it is directed away from the outlet edge of the seal and is likely not to force the seal away from the plug. As a matter of fact, the increased pressure will actually increase the sealing force since it will ordinarily act on the outside of the sleeve-like seal to tightly hold the inner surface of the seal against the plug.

Yet another feature is a further surface area from the circumferential area of the plug which tapers inward toward the inlet bore so that the inlet booster air is directed uniformly around the plug to open the seal.

DESCRIPTION OF THE PREFERRED EMBODIMENT

Figure 2:
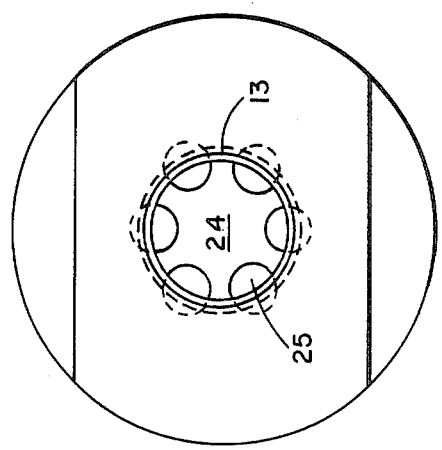
FIG. 2 is an end view taken from the inlet side of the valve of FIG. 1.

The valve comprises a housing generally designated by reference numeral 10 containing a hollow chamber 11, an outlet bore 12 and an inlet bore 13 both in communication with the chamber 11. Although not signficiant to the invention, in this embodiment the housing 10 is actually made up of three main components, namely a generally cylindrical hollow shell 14, inlet body 15 which is threadably engaged to one end of shell 14 and an outlet body 16 which is press fitted into the other end of shell 14. The outlet body has internal threads 17 for suitably mating with a pipe or tube for connection to the conveying tube or conduit, not shown, and the inlet body 15 is threaded at 18 for engaging a pipe or conduit connected to a suitable gas or air pressure source, also not shown. A solid rigid plug member 19 is located centrally radially in the chamber 11 and is held in that position by means which will be described later. The plug 19 has a circumferential outer surface area generally designated 19A, an adjoining surface area which is tapered inward toward the outlet bore 12 and is generally designated 19B and another adjoining surface area 19C which is tapered inwardly toward the inlet bore 13. Tightly surrounding the circumferential surface 19A is the inner surface of a sleeve-like or annular resilient sealing member 20. One end 20A of the sealing member opens towards the outlet bore 12 and the other end 20B opens towards the inlet bore 13. The inlet end 20B of the seal member is tightly held against a shoulder on the inlet member 15 by a retainer 21 which is press fitted into the interior of shell 14. The end 20B can be secured at the inlet in any workmanlike fashion and in this instance it may be secured in place by the groove and lip arrangement of retainer 21 and seal 20. As stated before, the seal can be secured in place in any fashion but the important factor is that it has to be tightly sealed so that the gas or air cannot get around the edge of the seal at the inlet side.

Figure 1:
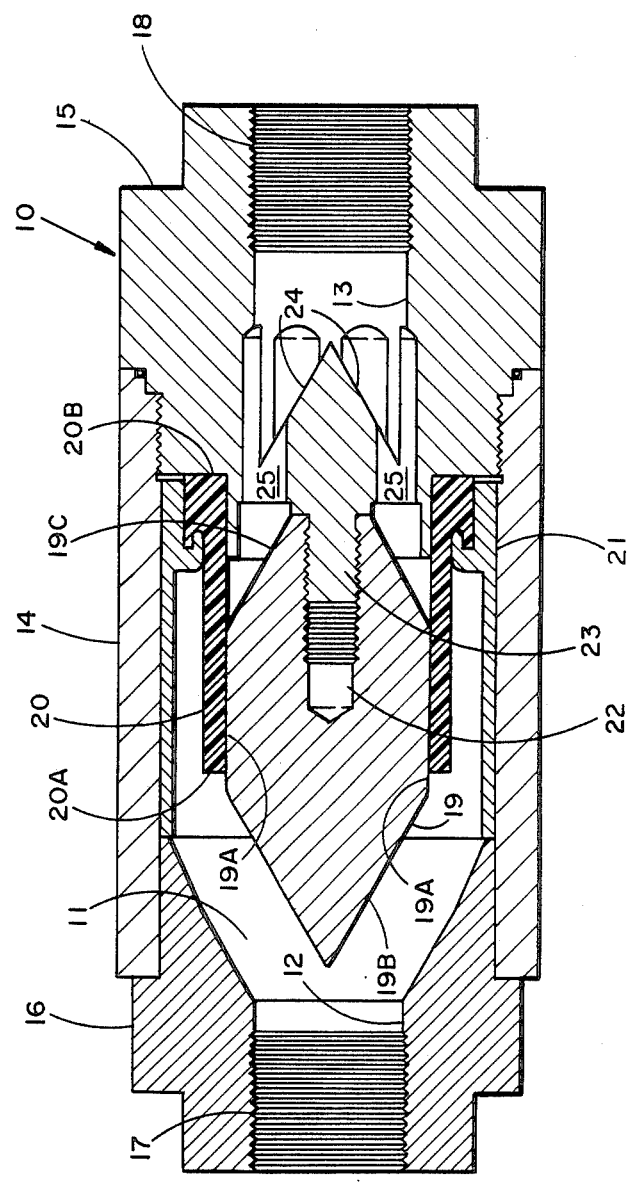
FIG. 1 is a sectional view of a booster valve illustrating the improved sealing means.

With the arrangement as illustrated and described with respect to FIG. 1 there is no communication between the inlet bore 13 and the outlet bore 12 via the chamber 11. In general, if the input or inlet pressure is below the outlet pressure the seal 20 is being secured tightly against plug surface 19A by the pressure acting on its outside surface in addition to the force exerted by the resiliency of seal member 20. It should be pointed out that in general the inner diameter of seal 20 is slightly less than the outer diameter of plug 19 at surface 19A so that there is a resilient force acting to hold the seal 20 tightly against plug 19. Also, it should be noted that preferably the outlet end 20A of the seal is located a short length back from where surface 19A adjoins surface 19B. In this way any reverse air flow from the outlet bore 12 will be directed by the tapered surface 19A outward away from the seal and, therefore, not likely to lift the end of the seal away from the plug.

In order for there to be any flow from the inlet bore 13 to the outlet bore 12 the pressure at the former has to not only exceed the pressure at the latter which is acting to hold seal 20 against plug 19 but also must be great enough to overcome the resilient force of the seal holding tightly against the plug. Only when that point is reached will the seal 20 be lifted away from the plug 19 to permit the passage of air to the outlet bore and then to the conveying tube.

In the embodiment illustrated plug 19 has an elongated internally threaded recess 22 extending axially from its inlet side to make threaded engagement with an externally threaded extension stud 23 from the inlet body 15. To allow the air to pass from the inlet bore 13 to the chamber 11 while still providing means for holding the plug 19 in place in the chamber an inward tapering surface 24 is machined out of the inlet body member 15 and a series of circumferentially equally spaced passageways 25 are formed through the inlet body member 15. In this fashion the pressurized air entering in the inlet side to inlet bore 13 will be uniformly distributed as it enters chamber 11 so that it will act uniformly on the seal 20 surrounding plug 19.

Alternatively the inlet body 15 may be cast from an investment casting with a series of spaced-apart ribs extending inwardly from the outer shell to provide the support for the stud to which the plug 19 is mounted.

Typically, with no limitation thereto being intended, a booster valve constructed according to the teachings of this invention may be made of mild steel, have an outer diameter of about 2.5 inches, inlet and outlet bores of about ¾ inch diameter, a plug made of mild steel having an outer diameter of about 1.28 inches and a length from its flat end to its pointed end of about 2.88 inches and a seal made of 40-45 durometer Buna N rubber or other resilient material having an inner diameter of about 1.23 inches, a wall thickness of about ⅛ inch and overall length of about 1.65 inches.

I claim:

1. A high pressure pneumatic booster valve, comprising:
   a housing;
   an elongated generally cylindrical chamber within said housing, said chamber having an inlet at one end through which all received pressurized fluid enters longitudinally directly into said chamber and an outlet at the other end through which pressurized fluid exits said chamber;
   an imperforate plug member located within said chamber, said plug member having a cylindrical section with its axis coaxial with the chamber axis and an uninterrupted outer cylindrical surface spaced from the chamber wall and a surface area attached to the inlet end of said cylindrical surface tapered inward toward the chamber inlet;
   an elongated annular resilient seal means having an axial through passageway of uniform diameter and a wall of uniform thickness attached to one end to said housing around said chamber inlet for confining all of the received pressurized fluid within said seal means passageway and directing it longitudinally around the outside of said plug member;
   means for uniformly distributing the fluid at said inlet comprising a distributing surface tapered inward toward said chamber inlet, said distributing surface leading to a plurality of circumferentially equally spaced passageways which direct the fluid into engagement with said plug tapered surface area without impacting said seal means;
   said plug tapered surface directing all of the pressurized fluid received via said inlet and said uniformly distributing means to first impact the seal means passageway;
   said seal means extending into said chamber to resiliently snugly seat against at least part of the outer cylindrical surface of said plug member for closing off the longitudinal fluid flow from said chamber inlet through said chamber to said chamber outlet until the force of the fluid pressure impacting the seal means passageway exceeds the combined fluid pressure at the outlet and the resilient force holding the seal means seated against the outer cylindrical surface of said plug member to allow fluid flow from the inlet around the outside of the plug member to the outlet.

2. The invention as described in claim 1 wherein said plug member has another surface area attached to the other end of the cylindrical surface which tapers inward toward the chamber outlet.

3. The invention as described in claim 1 wherein the end of the seal means facing the chamber outlet is located on the cylindrical surface of said plug member away from its outlet end.

4. The invention as in claim 1 wherein said plug member is attached to said housing at the chamber inlet end.

5. The invention as in claim 4 wherein the plug member is attached to the housing by said uniformly distributing means.

* * * * *